(12) United States Patent
Fröhlich et al.

(10) Patent No.: US 12,683,347 B2
(45) Date of Patent: Jul. 14, 2026

(54) WIRE PROCESSING CENTER

(71) Applicant: ZOLLER & FRÖHLICH GMBH,
Wangen im Allgäu (DE)

(72) Inventors: Christoph Fröhlich, Wangen (DE);
Michael Mennig, Bad Wurzach (DE);
Hans Leupolz, Argenbühl (DE); **Steffen
Hartinger**, Wangen (DE)

(73) Assignee: ZOLLER & FRÖHLICH GMBH,
Wangen im Allgau (DE)

( * ) Notice: Subject to any disclaimer, the term of this
patent is extended or adjusted under 35
U.S.C. 154(b) by 602 days.

(21) Appl. No.: 18/031,403

(22) PCT Filed: Oct. 14, 2021

(86) PCT No.: PCT/EP2021/078549
§ 371 (c)(1),
(2) Date: Apr. 12, 2023

(87) PCT Pub. No.: WO2022/079215
PCT Pub. Date: Apr. 21, 2022

(65) Prior Publication Data
US 2023/0291162 A1 Sep. 14, 2023

(30) Foreign Application Priority Data

| | | |
|---|---|---|
| Oct. 14, 2020 | (DE) | 102020127082.8 |
| Jan. 25, 2021 | (DE) | 102021101497.2 |
| Oct. 13, 2021 | (WO) | PCT/EP2021/078364 |

(51) Int. Cl.
| | |
|---|---|
| *H01R 43/28* | (2006.01) |
| *B23P 19/00* | (2006.01) |
| *B23P 19/04* | (2006.01) |

(52) U.S. Cl.
CPC .............. *H01R 43/28* (2013.01); *B23P 19/00*
(2013.01); *B23P 19/04* (2013.01)

(58) Field of Classification Search
CPC ........... H01R 43/28; B23P 19/00; B23P 19/04
See application file for complete search history.

(56) References Cited

U.S. PATENT DOCUMENTS

| | | | |
|---|---|---|---|
| 5,878,469 | A | 3/1999 | Wier |
| 6,662,444 | B2 | 12/2003 | Takada |

(Continued)

FOREIGN PATENT DOCUMENTS

| | | |
|---|---|---|
| DE | 9304398.8 U1 | 7/1993 |
| DE | 4440835 C1 | 8/1996 |

(Continued)

OTHER PUBLICATIONS

Written Opinion mailed Jan. 21, 2022 re PCT/EP2021/078549 (17
pages) original with English translation.

(Continued)

*Primary Examiner* — Ryan J. Walters
(74) *Attorney, Agent, or Firm* — Mindful IP PLLC

(57) ABSTRACT

A wire processing center includes a plurality of processing
modules located on or at a rotary table. The processing
modules are driven via a common control and are configured
to assemble cables with different cross-sections and/or to
provide cable ends with contacts or the like and have a
storage for cable cross-sections to be processed and/or the
assembled cables. The processing modules are positioned on
a rotary table which is provided with a driver in order to
orient one processing module at a time with respect to at
least one processing station arranged in the circumferential
region of the rotary table.

8 Claims, 1 Drawing Sheet

(56) References Cited

U.S. PATENT DOCUMENTS

| | | | |
|---|---|---|---|
| 8,442,664 B1 | 5/2013 | Guglielmo et al. | |
| 11,398,709 B2 | 7/2022 | Fröhlich et al. | |
| 11,953,876 B2 * | 4/2024 | Fröhlich .............. | H01R 43/052 |
| 2010/0293780 A1 | 11/2010 | Kirst | |

FOREIGN PATENT DOCUMENTS

| | | |
|---|---|---|
| DE | 19714964 C1 | 7/1998 |
| DE | 19831588 A1 | 9/1999 |
| DE | 102004057818 B3 | 8/2006 |
| DE | 102015102060 A1 | 8/2016 |
| DE | 102015119217 A1 | 5/2017 |
| DE | 102017118968 A1 | 2/2019 |
| DE | 102018131444 A1 | 11/2019 |
| EP | 0132092 A1 | 1/1985 |
| EP | 1403983 A1 | 3/2004 |
| JP | 58135743 A | 12/1983 |
| JP | H5133844 B2 | 5/1993 |
| WO | 2019061562 A1 | 4/2019 |

OTHER PUBLICATIONS

Office Action issued against correlated Japanese Patent Application No. 2023-522893, mailed on Jun. 11, 2024 including translation herewith (6 pages).

German Search Report dated Oct. 29, 2021 re DE102021101497.2 (10 pages).

International Search Report mailed Jan. 21, 2022 re PCT/EP2021/078549 (6 pages) original with English translation.

* cited by examiner

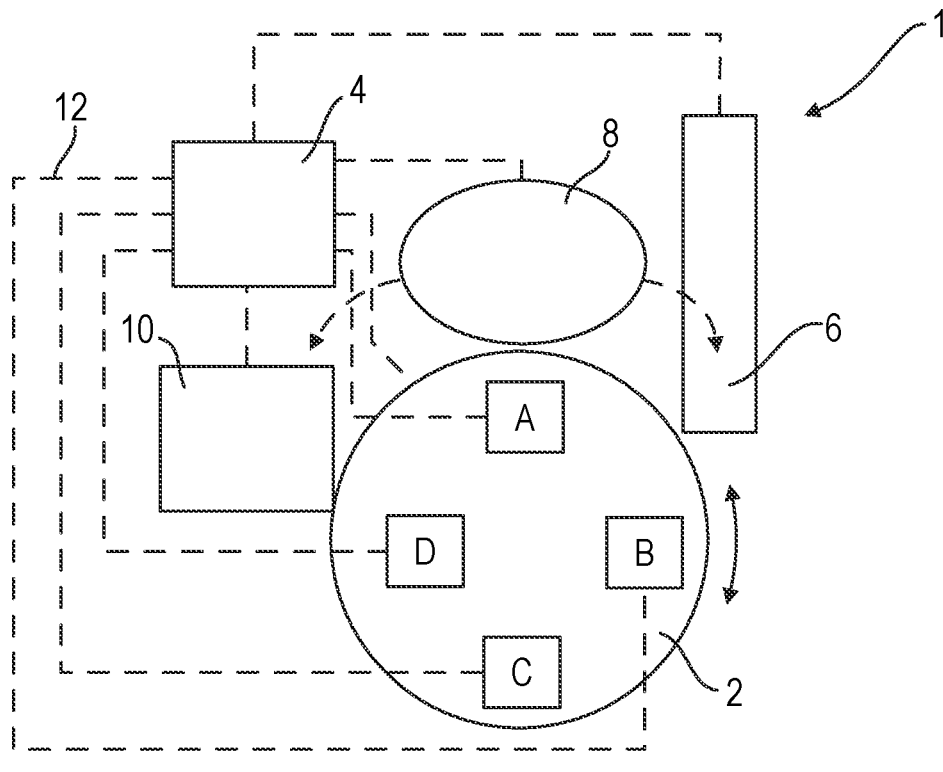
<u>Fig. 1</u>
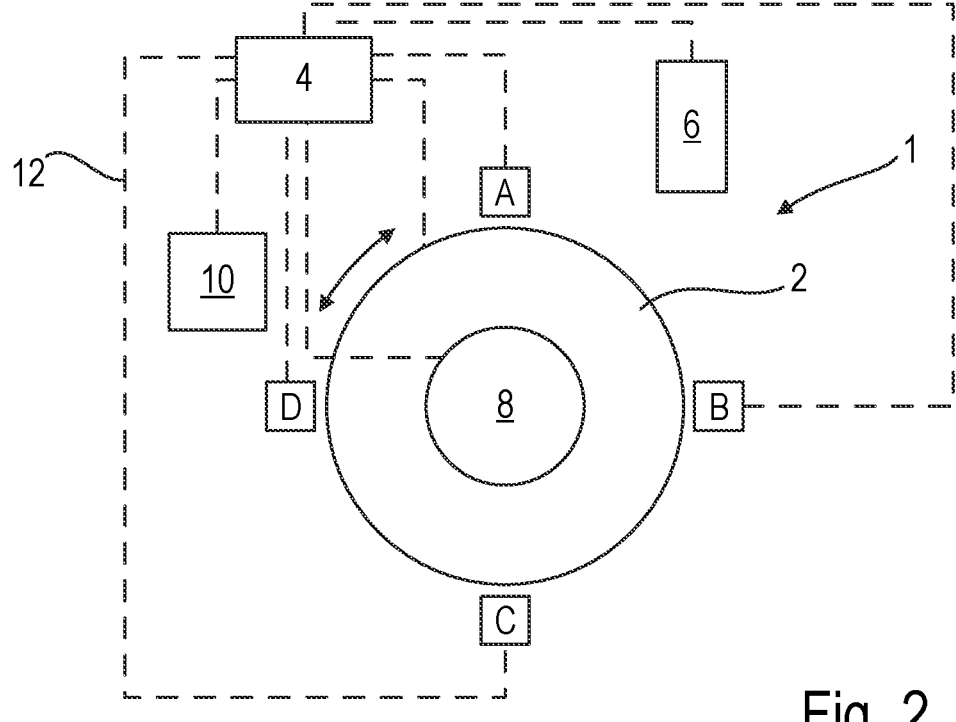
<u>Fig. 2</u>

WIRE PROCESSING CENTER

CROSS REFERENCE TO RELATED APPLICATIONS

The present patent application is a national stage of, and claims priority to, PCT Application No. PCT/EP2021/078549, filed Oct. 14, 2021, which application claims the priority of the German patent application 10 2020 127 082.8 filed Oct. 14, 2020, German patent application 10 2021 101 497.2 filed Dec. 21, 2020, German patent application 10 2021 115 186.4 filed Jun. 11, 2021 and PCT/EP2021/078364 filed Oct. 13, 2021, the disclosures of which are incorporated by reference in the present patent application in their entireties.

TECHNICAL FIELD

The disclosure relates to wire processing centers for the assembly of cables which are to be routed, for example, in switch cabinets.

BACKGROUND

With such a center, cables can be fed with lines, cut to length, marked and crimped with a contact element, for example a wire-end sleeve. The assembled cables are then usually bundled and stored in a storage arrangement. Such a center is disclosed, for example, in U.S. Pat. No. 8,442,664 B1. The actual cable assembly is performed by a unit that is configured as a special machine and enables the above-described work steps to be carried out. Such a unit has an extremely complex structure and can only be adapted to different production tasks at great expense. Furthermore, such a special machine is relatively expensive and requires a large installation space within the production line.

A similar solution is described in EP 0 132 092 A1. It discloses a device for the production of cable trees in which cables/lines are fed via a cable feed device and contact elements via a further feed device. The cables are cut to length via a cutting device and crimped with contact elements via an automatic crimping machine. For further processing, the assembled cables are then further transported via a measuring and feed device. A crimping head and a forming tool that holds the contact element during crimping are configured as separate units, wherein cutting devices are integrated into the unit that holds the crimping head. This device shows the same disadvantages as the special machine described above.

Document U.S. Pat. No. 6,662,444 B2 discloses a method and a device wherein one end portion of a cable can be either crimped to a contact element and/or another end portion can be crimped to a connector. The device used for this purpose has a wire feed device via which wires are cut to length and the corresponding end portions are stripped for contacting with a crimp terminal or the plug. Cutting to length is performed via a cutter, the cut-to-length cables/wires are then bent into a U-shape and positioned at a buffer storage, from where the cables are fed to a further device for crimping.

This solution is also a special machine specifically configured for the predetermined purpose.

Document U.S. Pat. No. 5,878,469 A relates to a device for processing cable harnesses, which has a cutting device, a stripper, a type of crimping unit and a device for connecting to a connector. This solution is also configured as a special machine and cannot be adapted to other manufacturing tasks, or only at considerable expense.

A more flexible solution is to provide modular units instead of a special machine, on which the individual processing steps (cutting to length, marking, stripping, crimping, bundling) are then carried out by a worker. Crimping is carried out with a crimping machine, as known for example from patent specification DE 44 40 835 C1 of the Applicant, and is used for example to crimp wire-end sleeves with a stripped cable end. In the known solution, these wire-end sleeves are rolled up as a belt on a drum magazine and are conveyed from this via a transport unit to a crimping head. Alternatively, the wire-end sleeves or contact elements can also be held individually in a storage unit and can then be conveyed in a defined position to the crimping head via a suitable feed device. Such a feed device is described, for example, in DE 198 31 588 A1.

In the known solutions, the wire-end sleeve to be crimped is placed on the stripped cable end via a holding unit and then pressed via the crimping head. The cable end can be stripped either externally or via a stripping head integrated in the crimping machine.

The modular units described above are configured as standalone units, which are each provided with their own drive units, for example, and are thus usually operated independently of further processing units.

The configuration of a transport unit for conveying the wire-end sleeves or other electrical components arranged on a belt is described, for example, in document G 93 08 266.5 of the Applicant. A similar transport unit is also disclosed in DE 197 14 964 C1.

US patent application US 2010/0 293 780 A1 shows a movable unit via which contact elements to be processed are positionable in the region of a stationary cable assembly device configured as a special machine.

In series production, it is necessary to press different cable cross-sections and electrical components/contact elements together and then install them in a subsequent mounting step, for example when mounting a control cabinet. In principle, there are two options for this: in one variant, the crimping machine is converted for pressing different cable cross sections and/or contact elements (wire-end sleeves), or several crimping machines are provided for processing the different cable cross sections/contact elements. The first solution requires long set-up times and considerable manpower. This disadvantage is overcome in the latter solution with a large number of crimping machines—however, the investment costs are considerable.

Document DE 10 2004 057 818 B3 discloses a machine (configured as a stripper or crimper) that can process different cable cross-sections and wire-end sleeves. A drum magazine and an associated crimping device are provided for each type of wire-end sleeve, which are assigned a common drive that can be optionally brought into operative engagement with one of the crimping devices. A solution of this kind requires a great deal of device-related effort, since a large number of crimping units have to be provided and driven.

In DE 10 2015 119 217 A1, which originates from the Applicant, a crimping machine is shown with which the above-mentioned disadvantages are eliminated. This crimping machine has a storage arrangement with several drum magazines, to which a common transport unit and a common crimping head are assigned, so that the device-related effort is significantly reduced compared to the solution described above.

DE 10 2017 118 968 of the Applicant discloses a crimping machine in which a contact element to be crimped is guided directly into the effective range of a stripping or crimping head without the interposition of a feed device or the like. In this known solution, the contact elements are preferably stored in drum magazines, so that the crimping machine is configured accordingly with a separating device.

DE 10 2015 102 060 A1, also originating from the Applicant, shows a crimping machine in which different wire-end sleeves are stored in a storage arrangement with several drum magazines. A transport unit is assigned to each of these drum magazines, via which the respective prese-lected wire-end sleeve is transported to a transfer position. The wire-end sleeve cut off there is then fed to a common crimping head via a shuttle.

This crimping machine is characterized by high produc-tivity. However, a certain disadvantage is seen in the fact that the required shuttle has a comparatively complex configu-ration and takes up corresponding installation space, and stripping is not possible.

Due to the high proportion of manual work, the demands on workers during assembly and in particular during the subsequent routing of the cables in the control cabinet are relatively high, whereby errors cannot be ruled out.

SUMMARY

In order to overcome the disadvantages of the concepts described above, WO 2019/061562 A1 of the Applicant proposes a modular wire processing center in which the processing modules are arranged on a mobile platform.

Although such a concept can be adapted very flexibly to different production tasks, automation to a large extent without the involvement of a worker is difficult to imple-ment.

In contrast, the object of the disclosure is to create a wire processing center that enables largely automated cable assembly.

This object is solved by a wire processing center having the features of the independent claims.

Advantageous further developments of the disclosure are the subject matter of the dependent claims.

The wire processing center according to the disclosure has a plurality of processing modules that can be driven via a common control unit and appropriately configured software. The processing modules are configured, for example, to assemble cables with different cross sections, to provide cable ends with contacts or the like and, if applicable, to provide the assembled cables with information. The wire processing center furthermore has a storage for the cable cross sections to be processed and/or the finished, assembled cables. According to a configuration example of the disclo-sure, the processing modules are positioned on a rotary table which is adjustable via a drive, in order to orient one processing module at a time with respect to a processing station arranged in the circumferential region of the rotary table.

The concept according to the disclosure thus breaks away from conventional solutions in which the cable to be assembled is fed to the processing modules by a worker, so to speak, and instead moves the processing modules to a central processing station or orients the processing modules with respect to the processing station. Such a wire process-ing center can be configured in a very compact form, since the space required by the processing modules on the rotary table is minimal, and furthermore the device-related effort required for conveying the cable between the processing stations is eliminated.

Alternatively, it is also possible to arrange the processing station, for example a robot, centrally and the processing modules on the circumferential side so that the robot is oriented to the processing modules via the rotary table.

In a further alternative solution, the processing station can be arranged in a movable manner around the rotary table.

Processing is further optimized if the processing station is configured with a handling device that is configured to remove cables from the storage and to transfer them to the respective processing module located at the processing station or to remove them from a processing module and to transfer them to a further processing module or a removal storage.

In a preferred solution, the handling device is configured in such a way that the cable to be assembled is held in an intermediate position when moving the rotary table.

The processing modules may be, for example, an auto-matic cutting machine, an automatic crimping machine, a sleeve station, a printing station, or an automatic stripping machine.

Driving processes are particularly flexible when the han-dling device is a robot driven by the control unit.

The costs of the system can be further minimized when at least some of the processing modules are standard process-ing units that can be operated individually and are, in principle, also functional in a stand-alone mode.

In one configuration example, the removal storage or the storage with the cable blanks is configured as a tubular storage, or a quiver storage respectively. Of course, other suitable storages, such as a linear storage, may also be used.

It is preferred that this tubular storage is mobile, so that a corresponding cable set can be prepared externally and can then be placed in an access position at the processing station.

BRIEF DESCRIPTION OF THE DRAWINGS

Preferred configuration examples are explained in more detail below with reference to schematic drawings. The following is shown:

FIG. 1 shows the basic concept of two wire processing centers according to the disclosure, and FIG. 2 shows a third configuration example of a wire processing center according to the disclosure.

DESCRIPTION

FIG. 1 shows the basic concept of the wire processing center 1 according to the disclosure. Accordingly, it has a rotary table 2, on which four processing modules A, B, C, D are arranged as an example. The drive of the rotary table 2 and the individual processing modules A, B, C, D are driven by a control computer 4 (CPU) of a control unit. All functional components of the wire processing center 1 can be driven via this control computer. The cable blanks to be processed are fed from a supply storage 6, which is config-ured, for example, as a tubular storage and is preferably a mobile storage 6 that can be easily moved to the set transfer position.

This storage 6 may also be configured with a removal storage, in which the assembled cables are stored. However, it is preferable to configure such a removal storage sepa-rately from the supply storage, so that a more flexible adaptation is possible.

As mentioned, the rotary table 2 can be rotated and/or adjusted in height via a drive, which is not shown, so that the respective processing module A, B, C, D can be oriented with respect to a processing station 8. According to the disclosure, a robot is positioned in the area of this processing station 8, which handles the cable to be assembled and is thus at least part of the processing station 8. Depending on the type of cable assembly, different table processing modules A, B, C, D (table machines) can be flexibly combined on such a rotary table 2 in order to process a list of cables/wires.

As further shown in FIG. 1, the processing station 8 (handling device/robot) may have assigned a buffer storage 10, in which cables can be temporarily stored during assembly. For example, it is possible to provide one end of the cable with a first contact and to store this in the buffer storage 10. In order to crimp a further contact onto the still free end of the cable, this is then removed from the buffer storage 10 and returned to a processing module, for example the automatic crimping machine, for further processing.

Control and signal lines 12 between the control computer 4 and the individual components are indicated by dashed lines in the figures.

In the following, an example of an assembly cycle is explained.

The robot removes the cable blanks from the storage 6 and moves them to the processing module A, which is located at the processing position shown in FIG. 1. This may be a cutting/stripping unit, for example, which is used to cut the cable to size and to strip the cable end.

The robot then takes the cut cable end from the processing module A. The rotary table 2 is driven to bring the next processing module into the processing position. In this processing module, the cable is then fed via the processing station 8, in particular the robot, and processed further. The processing sequence does not necessarily have to correspond to the sequence of the processing modules on the rotary table (A→B→C→D→removal storage). In principle, the processing modules A, B, C, D can be brought into operation in any order. In this way, changeover times of the cable assembly center can be minimized, since, for example, processing modules that are not required do not have to be removed, but are simply not brought into the processing position.

The wire processing center 1 is configured in such a way that different wire cross-sections, for example (0.5-6 qmm), can be flexibly uncoiled and fed.

As explained, these wires are to be cut to length on a processing module A, B, C, D. Subsequently, the pre-assembled cable can be crimped with a contact, for example.

For this purpose, several stations/modules are available in order to process different contacts on the cable ends, for example wire-end sleeves, with and without plastic collars, twisted contacts, etc.

In principle, it is also possible to process only wires, coaxial cables, etc. at the wire processing center 1. In addition or supplementary, a sleeve station or a different marking system may be provided.

Alternatively, labeling/marking may also be performed via a printer (inkjet printer, special markers, thermal transfer printer) or via a laser, wherein the labeling is preferably performed directly on the cable conductor.

In a preferred configuration, the robot is stationary in the region of the processing station. In principle, however, it is also possible to configure the robot and thus the processing station to be movable.

In an alternative solution, the rotary table 2 may be configured to be stationary and the robot (processing station 8) may be configured to be movable along the circumference of the rotary table 2 so that the cables are fed to the processing modules A, B, C, D by the robot during the individual processing steps. This variant is indicated in FIG. 1 by the two dashed arrows, which indicate the mobility of the processing station 8, which is configured with a robot/handling device, for example, along the circumference of the rotary table 2. It is also quite possible that the rotary table 2 itself is still rotatable (this has already been pointed out above).

FIG. 2 shows a configuration example in which the processing station 8 (for example with the robot/handling device) is fixed on the rotary table 2 while the processing modules A, B, C, D are arranged along the outer circumference of the rotary table 2 in a preferably fixed position. The positions of the storage 6, of the control computer (CPU) 4 and of the buffer storage 10 correspond functionally to the respective positions in the configuration examples according to FIG. 1. In this variant, the processing station 8 is thus oriented with respect to the respective processing module A, B, C, D via appropriate driving of the rotary table drive, with which it is adjusted by a predetermined angle of rotation, so that the production steps described above are carried out accordingly by driving the rotary table 2 and the robot positioned thereon (processing station 8) and the associated relative positioning of the processing station 8 with respect to the respective processing module A, B, C, D that can be brought into operative engagement. In this variant, the buffer storage 10 and the storage 6 are of course positioned in such a way that they can be reached via the processing station (handling device, robot) 8 and thus, for example, the cables can be fed to the respective processing module A, B, C, D.

In principle, hybrid forms are also possible in which processing modules and components of the processing station (robot, handling device) are positioned both on/at the rotary table 2 and on its circumference. The Applicant reserves the right to make a separate, independent patent claim for this hybrid solution.

Disclosed is a wire processing center having a plurality of processing modules arranged on or at a rotary table.

LIST OF REFERENCE SYMBOLS 1 processing center
2 rotary table
4 control computer/CPU
6 storage
8 processing station
A, B, C, D processing module
10 buffer storage
12 control/signal/energy supply lines

What is claimed is:
1. A wire processing center comprises:
a plurality of processing modules, which are driven via a common control unit and are configured to assemble cables with different cross-sections and/or to provide ends of the cables with contacts, and having a storage for the cables with different cross-sections to be processed and/or the assembled cables; and
a rotary table on which processing modules are positioned and which is provided with a drive in order to orient one of the plurality of processing modules at a time with respect to at least one processing station of the wire processing center arranged in a circumferential region of the rotary table;

wherein the at least one processing station is configured to be movable along a circumference of the rotary table in order to bring the cables to be processed into a processing position with respect to the processing modules, where the cables are fed to the processing modules by the at least one processing station during individual processing steps.

2. The wire processing center according to claim 1, wherein the at least one processing station has a handling device that is configured to remove cables from the storage and to transfer them to the respective one of the plurality of processing modules oriented with respect to the at least one processing station or to remove them from a processing module of the plurality of processing modules and to transfer them to a further processing module of the plurality of processing modules or to a removal storage.

3. The wire processing center according to claim 2, wherein the handling device is configured to hold the cables in an intermediate station when moving the rotary table.

4. The wire processing center according to claim 1, wherein the processing modules are respectively selected from a group of automatic cutting machine, automatic crimping machine, sleeve station, printing station, and automatic stripping machine.

5. The wire processing center according to claim 1, wherein a handling device is a robot driven by the common control unit.

6. The wire processing center according to claim 1, wherein at least some of the processing modules are processing units that can be operated individually.

7. The wire processing center according to claim 1, wherein a removal storage is configured as tubular storage or linear storage.

8. The wire processing center according to claim 1, comprising a buffer storage for an intermediate storage of cables.

* * * * *